United States Patent
Majanen et al.

(10) Patent No.: US 8,122,105 B2
(45) Date of Patent: Feb. 21, 2012

(54) METHOD, SYSTEM ARCHITECTURE AND COMPUTER SOFTWARE FOR COMMUNICATION BETWEEN DEVICES

(75) Inventors: Robert Majanen, Västerås (SE); Xiaohong Jin, Västerås (SE); Mattias Rehnman, Västerås (SE); Anders Rosvall, Helsingborg (SE); Jan-Erik Frey, Västerås (SE); Per-Ulrik Söderberg, Västerås (SE); Pablo-Lozan Villegas, Östhammar (SE)

(73) Assignee: ABB AB, Västerås (SE)

( * ) Notice: Subject to any disclaimer, the term of this patent is extended or adjusted under 35 U.S.C. 154(b) by 1371 days.

(21) Appl. No.: 10/465,998

(22) PCT Filed: Jul. 9, 2001

(86) PCT No.: PCT/SE01/01582
§ 371 (c)(1),
(2), (4) Date: Nov. 19, 2003

(87) PCT Pub. No.: WO02/054697
PCT Pub. Date: Jul. 11, 2002

(65) Prior Publication Data
US 2008/0172479 A1      Jul. 17, 2008

Related U.S. Application Data

(60) Provisional application No. 60/258,322, filed on Dec. 28, 2000.

(51) Int. Cl.
*G06F 15/173* (2006.01)

(52) U.S. Cl. ........................................ 709/220; 709/223

(58) Field of Classification Search .................. 709/224
See application file for complete search history.

(56) References Cited

U.S. PATENT DOCUMENTS 5,596,723 A * 1/1997 Romohr ....................... 709/222
(Continued)

FOREIGN PATENT DOCUMENTS

EP      0817444      1/1998
(Continued)

OTHER PUBLICATIONS

"Unifying conversational mutimedia interfaces for accessing network services across communication devices" by G.Di Fabbrizio, S. Narayanan, P. Ruscitti, C. Kamm, B. Buntschuh, J. Hubbel, J. Wright, J. Hamaker. AT&T Labs-Research 0-7803-5636-4/00-2000 IEEE.*

*Primary Examiner* — Kevin Bates
(74) *Attorney, Agent, or Firm* — Venable LLP; Eric J. Franklin (57) ABSTRACT

A method for communication between a plurality of devices connected to each other through a network. Each device includes at least one service that provides a set of functions for controlling and/or monitoring the device. A service of a first device detects the presence of a second device, detects the presence of a service of the second device, retrieves information about the functions of the service of the second device, and invokes a function of the service of the second device. A system architecture for communication between the devices includes a communication module configured to enable a service of a first device to detect the presence of a second device, to detect the presence of a service of the second device, to retrieve information about the functions of the service of the second device and to invoke a function of the service of the second device.

15 Claims, 4 Drawing Sheets

U.S. PATENT DOCUMENTS

| | | | | |
|---|---|---|---|---|
| 5,706,210 | A * | 1/1998 | Kumano et al. | 709/224 |
| 5,883,907 | A * | 3/1999 | Hoekstra | 714/784 |
| 6,085,236 | A * | 7/2000 | Lea | 709/220 |
| 6,115,392 | A * | 9/2000 | Nomura | 370/466 |
| 6,275,865 | B1 * | 8/2001 | Zou | 719/313 |
| 6,523,696 | B1 * | 2/2003 | Saito et al. | 709/223 |
| 6,571,277 | B1 * | 5/2003 | Daniels-Barnes et al. | 709/213 |
| 6,963,784 | B1 * | 11/2005 | Gibbs | 700/94 |
| 2002/0018448 | A1 * | 2/2002 | Amis et al. | 370/255 |
| 2002/0083143 | A1 * | 6/2002 | Cheng | 709/208 |
| 2008/0172479 | A1 * | 7/2008 | Majanen et al. | 709/221 |

FOREIGN PATENT DOCUMENTS

| | | |
|---|---|---|
| EP | 0817444 A2 * | 1/1998 |
| WO | 00/78001 | 12/2000 |
| WO | 00/78002 | 12/2000 |
| WO | WO0078001 A2 * | 12/2000 |
| WO | WO0078002 A2 * | 12/2000 |

* cited by examiner

METHOD, SYSTEM ARCHITECTURE AND COMPUTER SOFTWARE FOR COMMUNICATION BETWEEN DEVICES

CROSS-REFERENCE TO RELATED APPLICATIONS

The application claims priority to U.S. provisional patent application 60/258,322 filed 28 Dec. 2000 and is the national phase under 35 U.S.C. §371 of PCT/SE01/01582 filed 9 Jul. 2001.

FIELD OF THE INVENTION

The present invention relates to a method and a system architecture for communication between a plurality of devices connected to each other through a network, each device having at least one service which provides a set of functions for controlling and/or monitoring the device. A device is a physical unit which is able to perform a work. The device is for example a sensor, a motor, a valve, a cylinder, an industrial robot, heating, ventilation, and air-conditioning devices, or consumer devices such as washing machines and light appliances.

The invention is suitable in industrial-, building-, and home-automation in which information is exchanged between devices or between devices and control systems. In particular but not exclusively, the invention is a method, a system architecture and software for communication between devices comprising embedded intelligence.

PRIOR ART

Modern industrial control systems for process, control and manufacturing are developed for use in large automation systems for heavy industries, such as oil & gas and pulp & paper. These control systems must be able to handle several thousands of data signals and software objects representing real-word entities, which put high demands on the hardware it is running on. In a traditional control system, all communication is done between the control system and the devices and there is no direct communication between the devices. The devices send information to the control system about their status and state, and the control system sends control signals to the devices. This results in large control systems and an extensive network communication between the control systems and the devices. Such large industrial control systems requiring an extensive hardware are not suitable for small customers only having a few devices to control.

It is a trend today to provide embedded intelligence in industrial and consumers devices, so called embedded devices. An embedded device comprises hardware and software for performing operations on data from the device and makes calculations and logic decisions. In general, embedded devices have limited processing power and limited amount of memory. It is also known to connect embedded devices to a network and to make them communicate with each other. A system of embedded devices are capable of controlling and monitoring the devices locally, and thus the need of a control system is reduced and the communication load in the system is decreased.

A requirement of a control system is that it is easy to configure when a new device is connected to the system. For that purpose, a number of standards have been developed for automatic recognition of new devices, generally known as Plug and Play. One of the communication standards for home automation is Universal Plug and Play (UPnP). The UPnP specifies communication protocols for device discovery, remote method invocation and data subscriptions. UPnP is an architecture for peer to peer network connectivity between PCs of all types and embedded devices. When a new device is joined to the network, the device will send a message to all of the other devices in the network with information about itself.

Figure 1:
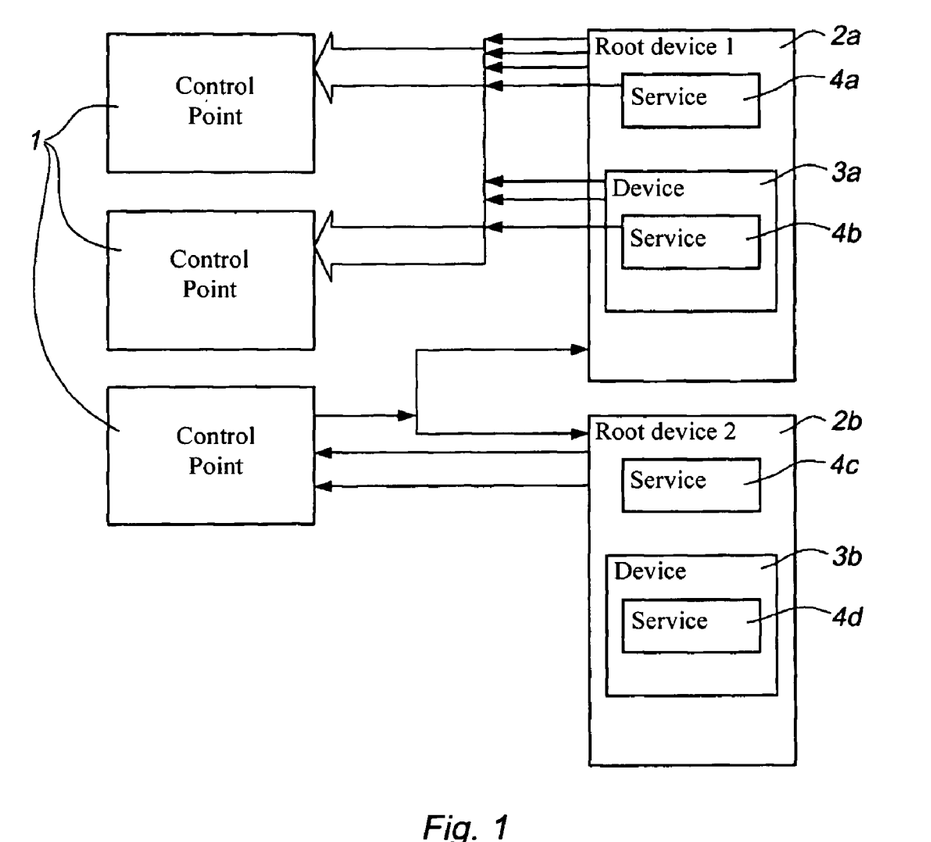
FIG. 1 Prior art, shows a schematic diagram of a known standard Universal Plug and Play for recognition of devices.

The UPnP architecture specifies a root device, a device, a service and a separate control point. The control point could for example be a control system. A service provides a set of function for controlling and monitoring the device. The functions in the services are only accessible from the control point. For example, the service provides the use of methods and subscription of variables, for instance temperature, speed, or alarm signals. FIG. 1 shows an outline of the architecture of the UPnP. The root device may contain one or more services and one or more devices. The device may contain one or more services. The communication in UPnP is enabled via control points. Thus, communication in this architecture can only take place between the control point and any of the root device, the services and the device. A control point may use functionality in a device or in a root device by invoking methods in their services. In a similar way the control point may read variables from a device or a root device by subscribing to variables of their services. However, a control point according to the UPnP can only subscribe to all available variables and not to selected ones.

In such a non-hierarchical system, all information sent from a device will be received by all of the other devices in the system. This could cause an unnecessarily large data-flow in the system. In particular there will be an enormous amount of messages sent when new devices are plugged into the system. The UPnP does not support a hierarchy of devices.

SUMMARY OF THE INVENTION

One object of the present invention is to provide a method for communication between devices in a system, which facilitates the communication between the devices and allows building of systems out of subsystems.

This object is achieved by means of the initially defined method, characterized in that a service of a first device detects the presence of a second device, detects the presence of a service of the second device, retrieves information about the functions of the service of the second device, and invokes a function of the service of the second device. Since a service of a device is allowed to invoke functions of services of other devices in the network in a direct point to point manner, it is no longer necessary to for the services to communicate through a control point. The method of the invention makes it possible to arrange devices and services into hierarchies, thus a large system may be divided into smaller subsystems. Hence, the flow of information in the system will be reduced by sending most of the information within the subsystems. The method according to the invention is suitable for both wired and wireless communication. An advantage of the invention is that it facilitates communication between devices in a very compact manner with respect to memory consumption.

According to one preferred embodiment of the invention, each device is represented by a service provider addressing the services of the device, and at least two service providers are arranged hierarchically by means of arranging a second service provider as a parent to a first service provider. By providing each device with one service provider which addresses the services belonging to the device, the building of hierarchies is further facilitated. Communication between devices must be done through the service providers of the devices. Accordingly, it is possible to build a hierarchy where the flow of information is structured for particular application purposes.

According to another preferred embodiment of the invention, when a new service is joined to the first service provider, the new service issues a message and the services addressed by the first and the second service provider receives the message and stores information associated with the new service. If three servic providers are arranged hierarchically relative to each other in the system, the services addressed by the third service provider ignore the message. In a hierarchical system of service providers and services, the scope of notification sent when a new service is joined to the system is preferably limited to two levels in the hierarchy, to the level at which the new service is positioned and the level above. This means that the message is only received by those services that have the same parent as the new joined service and the same parent as the service provider to which the new joined service is connected. All the other services in the system will ignore the message. Thus the flow of information in the system is reduced.

According to another preferred embodiment of the invention, the set of functions comprises a command for subscribing to alarms, which are sent to all subscribers upon change. Preferably, the set of functions also comprises a command for subscribing to events, which are sent to all subscribers upon change. In this embodiment of the invention, it is possible to specify the type of information (alarm, event or other data) to be subscribed to. This is an advantage, since the subscriber may choose which information to receive, and when he receives the information he knows whether the data received it is an alarm, an event, or process data.

According to another preferred embodiment of the invention, a service of a device comprises a number of predefined functions and the service is configured by selecting one or more of said predefined functions. When executed on very small systems, the functionality of a service can be reduced in order for the service to fit into a limited memory. Thus, this embodiment makes it possible to adapt the service to the available hardware which may be limited as regards memory and processing power. Preferably, said predefined functions comprise alarm and event generation, variable subscription, alarm subscription, event subscription, search and retrieve for other devices and remote method invocations.

According to another preferred embodiment of the invention, at least some of the services specify which services they are interested in, and when a new service is joined to the network the services interested in that service are notified about the new service. Preferably, the service specifies the name of, the type of services they are interested in, or whether they are interested in being notified of all new services. A problem in a large system is the disturbance of a service, due to the large amount of information to be received by it. To avoid unnecessary disturbance to a service caused by receiving uninteresting information, each service may specify which services it is interested in receiving information from. Thus, the services only receives information which they are interested in and the number of disturbances are limited.

According to another preferred embodiment of the invention, the service of the first device invokes a function of the service of the second device in a point to point manner by means of sending a message comprising a serialized stream of characters to the second device. This stream can be transferred wirelessly or over any physical medium. Preferably, the stream of characters is sent via a channel which is any of a null-modem, a normal modem, GSM, a third generation mobile communication, or a radio transmission such as one complying with Bluetooth standards.

A further object of the invention is to provide a system architecture for communication between a plurality of devices. This object is achieved by means of the system architecture initially defined, characterized in that it comprises a communication module having means for enabling a service of a first device to detect the presence of a second device, to detect the presence of a service of the second device, to retrieve information about the functions of the service of the second device, and to invoke a function of the service of the second device.

BRIEF DESCRIPTION OF THE DRAWINGS

The invention will now be explained more closely by the description of an embodiments thereof and with reference to the appended drawings.

DETAILED DESCRIPTION OF PREFERRED EMBODIMENTS OF THE INVENTION

FIG. 1 shows the UPnP architecture as described earlier. The UPnP architecture comprises control points 1, root devices 2a, 2b, devices 3a, 3b and services 4a-4d. The root device of the UPnP can contain a number of services and devices. The functionality of the control point is to provide communication protocols for device discovery, remote method invocation and data subscription. As shown in FIG. 1, all communication takes place via the control points 1.

A system architecture according to the invention comprises at least one communication module containing one or more service providers having one or more services. The communication module is only allowed to have service providers and is not allowed to have services. A service offers a set of functions for controlling and monitoring the device, for example subscription to data or execution of control commands. A device may have one or more services. When the device have more than one service, each service represent a group of functionality of a certain type, e.g. for diagnostic of the device or control of the device.

Each service in the architecture belongs to a service provider. A service provider represents a device or a subsystem comprising several devices and/or service providers and is a pure logical entity. A service cannot exist without a service provider. Therefore, when a service is started, it searches for a service provider to connect to. The services search either directly for a named service provider or any service provider. When the service has found a suitable service provider the service connects to the service provider.

The service provider reside within a communication module. The task of the communication module is to provide the communication framework, the communication functionality and may provide the execution environment for the services and to represent a node in the network. The communication module handles all communication to and from services. The communication module is pure software and implements protocols for device discovery, remote method invocation, data subscription and alarm, or event generation. The communication module generates and sends messages from services belonging to the module and receives and interprets messages to said services.

Figure 2:
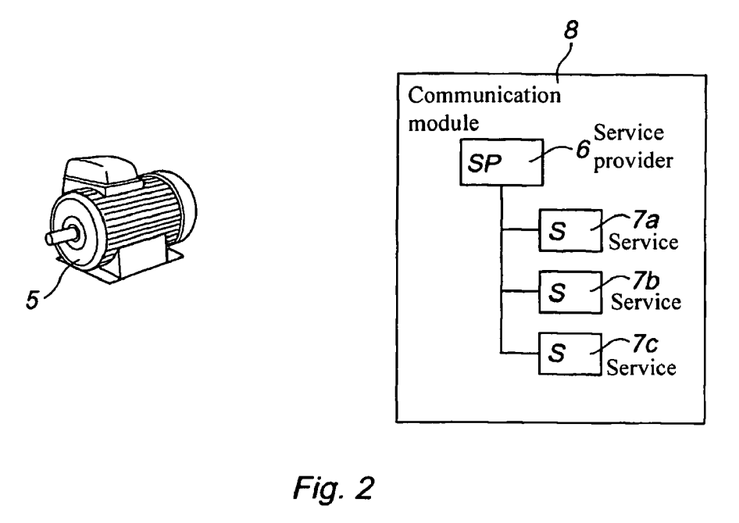
FIG. 2 shows a physical device and its software representation.

FIG. 2 shows a device 5, which is a motor, and its software representation according to the invention. The device is represented by a service provider 6 which addresses three services 7a-7c, each representing a group of functionality for monitoring and controlling the device. The first service 7a comprises functions for diagnostics, the second service 7b comprises functions for the human-machine interface and the third service 7c comprises control functions for the device. The service provider 6 and the services 7a-7c reside within a communication module 8.

Figure 3:
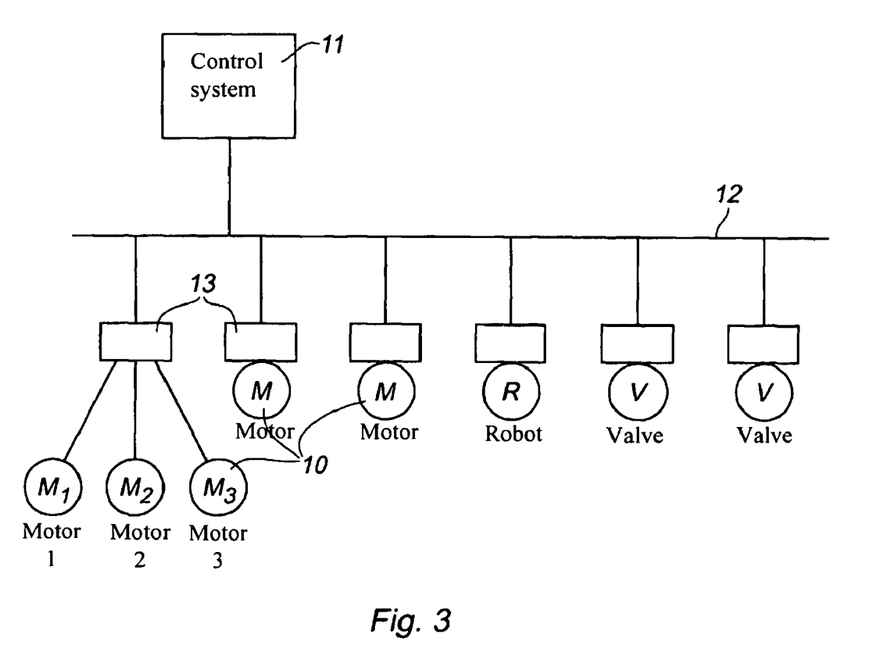
FIG. 3 show a number of intelligent devices connected to each other through a network.

FIG. 3 shows a plurality of devices 10 and a control system 11 connected to a network 12. A device is a unit that performs some work, e.g. a motor, a cylinder, a computer, or an industrial robot. The devices 10 are provided with hardware units 13 comprising a processor, memory and I/O connections. Some of the devices 10 are connected to the same hardware unit 13, as can be seen in FIG. 3. The hardware units 13 are connected to the network. Each of the hardware units is supported by a communication module and each of the devices 10 is represented by a service provider.

Figures 4, 5:
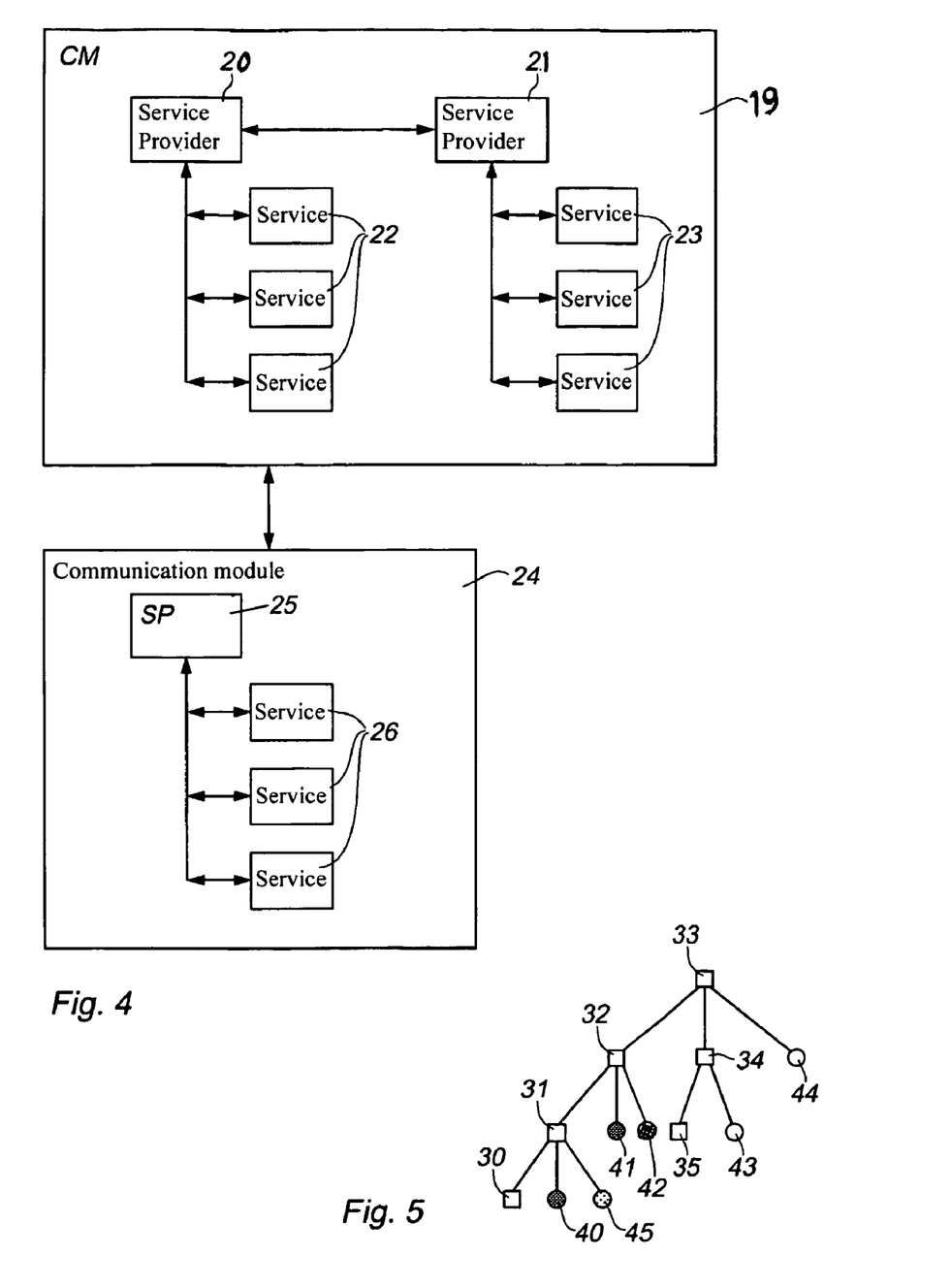
FIG. 4 shows a schematic diagram of an architecture for communication between devices according to an embodiment of the invention.
FIG. 5 shows a schematic diagram of notification of new services in a hierarchical way in an architecture for communication according to an embodiment of the invention.

FIG. 4 shows how the communication is achieved in a system architecture according to the invention. The system shown in FIG. 4 comprises a first communication module 19 having two service providers 20, 21, representing two devices, each service provider having three services 22, 23, and a second communication module 24 having a service provider 25 having three services 26 and representing a third device. Each of the services 22, 23, 26 is allowed to communicate with all of the other services in the architecture. Accordingly, this system architecture allows a service of a device to invoke functionality and access data in services of the other devices in a direct point to point manner. Communication between devices is always carried out via the service provider representing the device and communication between devices belonging to different hardware units is carried out via the communication module.

The main differences between the UPnP architecture and the system architecture according to the invention are that the communication module (corresponding to the root device) is not allowed to have any services and that there is no separate entity called a control point. Each service in the service provider acts as a control point using the control point functionality such as device discovery, remote method invocation, data subscription, and alarm or event generation, provided by the communication module. The architecture also makes it possible to build hierarchical system, i.e. it is possible to build systems based on subsystems. The system architecture according to the invention also offers the possibility to build self-contained devices, e.g. motors containing monitoring, diagnosing, documentation, control, and human machine interface. The device is represented by a service provider and the different functionalities are implemented as services belonging to the service provider.

The plug and play functionality is also introduced in the system architecture of the invention, and it allows the devices and services to announce their presence on the network and also to issue inquiries about the presence of other devices and their services. The services acquire knowledge of each other via notifications upon starting and stopping. When a new service is joined to a system, it issues a message comprising information about the new service and its functions. Other services in the system receive the message and store the information associated with the new service. After having gathered knowledge about each other, the services may manipulate other services by accessing the methods exposed, as well as receiving status information by subscribing to variables, alarms or events in other services. Thus, services of a physical device can be operated through manipulation and reading of its data.

FIG. 5 shows an example of a hierarchically arranged system. The system contains a plurality of service providers 30-35, some existing services 40-44, and a newly joined service 45. The service providers 30-35 are hierarchically arranged. The service provider 33 is a parent of service providers 32 and 34. The service provider 34 is a parent of service provider 35. Service provider 32 is a parent of service provider 31, and service provider 31 is a parent of service provider 30. In this embodiment of the invention the scope of notifications in the system is limited to two levels in the hierarchy: the level at which the new joined service is positioned and the level above. This means that notification from the newly joined service 45 is only received by the service 40 connected to the same service provider 31 as the new service 45 and by those services 41, 42 belonging to the same parent 32. The other services 43, 44 in the system will never receive the message.

Information about the hierarchy within the communication module and on a level above is kept by the communication module. The communication module, such as the communication module 20 in FIG. 4, uses the hierarchy information and sees to that messages are distributed within the hierarchy in accordance with the above rules. The reason why the notification is limited in those two levels is that the hierarchy is chosen to represent the information flow in the system. The relationship between a parent and its children represents the decomposition of a system into subsystems. Usually services belonging to a service provider on a high level in the hierarchy have more of a coordination role than the services located at lower levels. In this way, the data flow is largely reduced, since in a non-hierarchical architecture the notification would be received by every service in the network.

In the data architecture according to the invention, the communication module is one program unit, i.e. a separately executable piece of code. The communication module and the service providers are executed in, for example, one Java Virtual Machine, while each service is executed in its own virtual machine. This enables services of a service provider to be executed anywhere on the network. The communication module contains a number of service providers that reside in the same program unit. Services are resided either in their own program unit or as a part of the communication module. Thus, the architecture according to the invention is a distributed architecture, where different parts of the software may execute on different nodes on the network, i.e. a motor device might contain control services, while a more demanding diagnostics service is executed remotely on a workstation.

The communication between the services and the service provider is done differently in the two cases. When the services and the service provider reside in the same program unit, the communication between the service provider and the services are carried out using direct method calls. In the other case, when the services and the service provider reside in separate program units, the communication is done via a serialized stream of characters. This means that method-calls, variable values, and notification messages are serialized into a stream of characters. This stream can be transferred over any physical medium, e.g. a null-modem, a modem, GSM, a third generation mobile communication, or a radio transmission such as one complying with Bluetooth standards. Preferably, the services are written in Java. An advantage obtained then is the platform independence.

In the architecture according to the invention, it is possible for a service to subscribe to changes in selected groups of variables of other services. The variables possible for subscription is divided into three groups:

Alarm variables, which describe an alarm and are sent to all subscribers upon change.

Event variables, which describe an event and are sent to all subscribers upon change.

Other variables, i.e. pure process data which are defined by the user and sent to all subscribers upon change.

It is possible to subscribe to each of the groups separately, which means that a service may subscribe to the alarms of a second service without subscribing to events and other variables of the second device. There may be a number of variables in each group of variables. For instance, there may be five alarm variables specified. When a service is registered to subscribe to alarm variables, it receives all five alarm variables. Similarly, there may be many different types of event variables, and a subscription to event will cause the event variables to be notified to the subscribing service.

Since most embedded devices have limited processing power and limited amount of memory, the architecture according to an embodiment of the invention allows different functionality to be selected upon configuration of a service. A service comprises a number of program modules each performing different functions, for example alarm and event generation, variable subscription, alarm subscription, event subscription, search for and retrieval of other devices and remote method invocation. Search and retrieve is a function in which a search is made for other devices, service providers, or services and information about those objects are collected and returned when found.

The selection is done by using a software implemented engineering tool and comprises selecting functions among a plurality of predefined functions. Thus, by selecting the number of the modules to be installed in the hardware unit, the functionality of the services can be adjusted to fit the memory and processing power of that hardware unit. By means of the engineering tool for configuration, a user simply selects those of the functions desired by clicking on a button of a tab in a box displayed on a computer screen. Upon selection of the required functions from the predefined functions, the appropriate program code is included to configure the service.

Another way of reducing the processing power needed is to filter out unnecessary communication by means of the service provider. The services are provided with means for specifying which services they are interested in receiving information from. The service is specifying its interests upon connecting to the service provider and when a new service is joined to the network the services interested in that service are notified about the new service. The service specifies the name of or type of services they are interested in or if they are interested in being notified of all new services.

Figure 6:
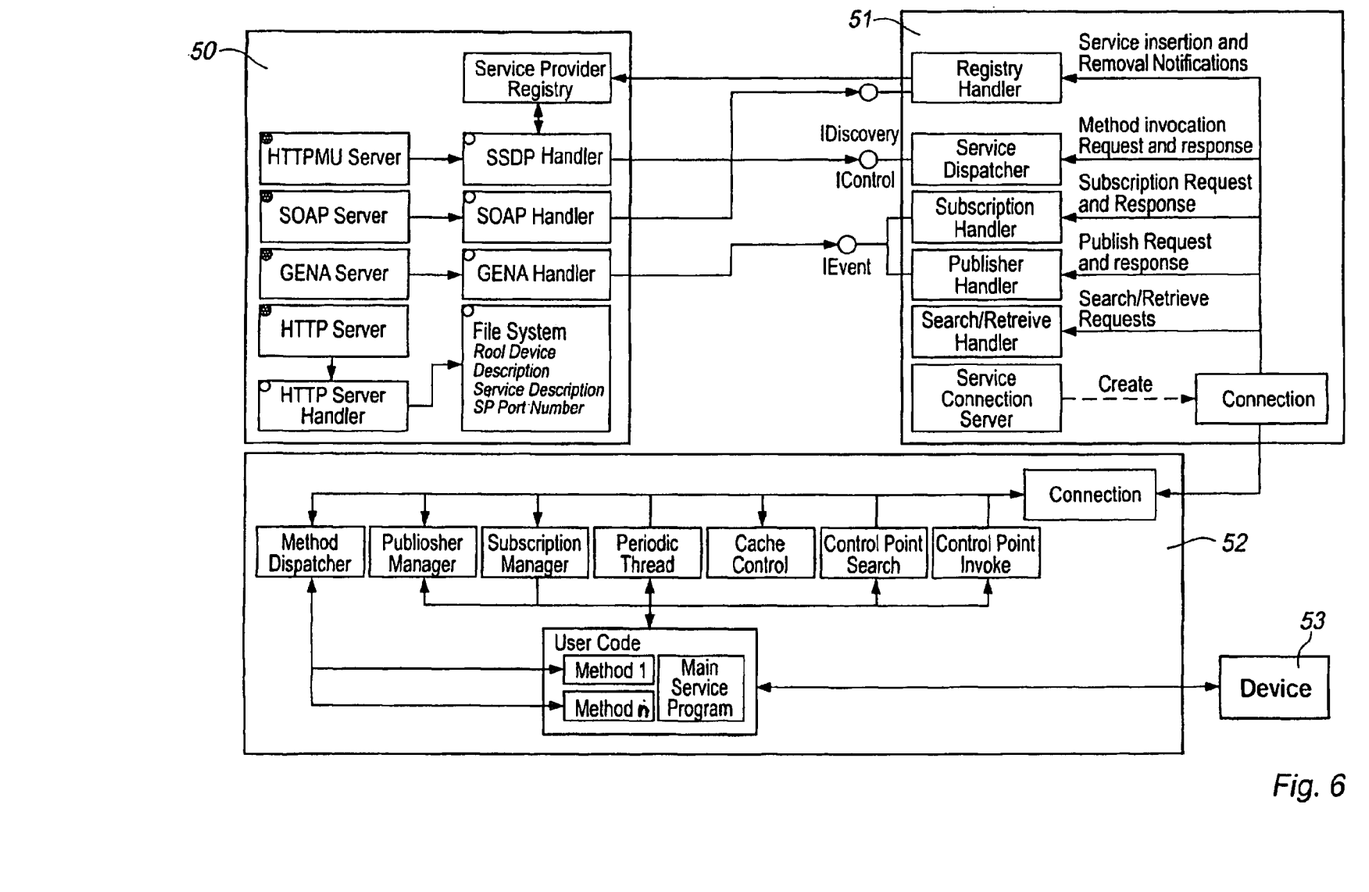
FIG. 6 shows a preferred embodiment of a system architecture according to the invention.

FIG. 6 shows a preferred embodiment of a data architecture according to the invention. A communication module 50, a service provider 51, a service 52, and a device 53 are shown. The communication module 50 includes servers for HTTPMU, SOAP (Simple Object Access Protocol), GENA, HTTP, and handlers for SSDP (Simple Service Discovery Protocol), SOAP, GENA, and the HTTP server. A service provider registry and a file system are shown included. The service provider includes a service dispatcher and a service connection server, and handlers for registry, subscription, publisher, and search/retrieve.

The service is shown to include control point functions of method dispatcher, publisher manager, subscription manager, a periodic thread, cache control, control point search, and control point invoke. The service also includes a user code comprising one or more methods, method 1 to method n, and a main service program.

Interfaces IDiscovery, IControl are shown enabling communication to the service dispatcher, the interface enabling IEvent enabling communication with the subscription and publisher handlers.

The communication module 50 and the service provider 51 interacts with each other via a number of interfaces for the discovery, control, and event mechanisms described above. The service provider interacts with its services via a standard TCP socket communication using a simple protocol known as ISP (Internal Service Protocol) or serial communication.

The communication module contains one UDP (User Datagram Protocol) multicast socket server, HTPPMU server, that is used for the discovery and announcement protocol. (IP multicast is an established known mechanism based on the Internet Protocol for sending a single message to multiple recipients.) It also contains three TCP socket servers for presentation, control, and event mechanism, HTTP server, SOAP server, and GENA server.

When a client attempts to connect to one of these, a corresponding handler is created that is responsible for interacting with the correct service provider. In order to be able to answer discovery messages from other systems, the communication module contains one module for keeping track of service providers and their services, the service provider registry.

It is understood that any of the methods described may be carried out by a computer program or computer software containing a computer program code element or computer code means, or software code portions. The computer program product, when run on a standard computer or processor, makes that computer or processor carry out one or more of a series of instructions according to any of the methods described.

One or more computer program products comprising the data architecture or for carrying out methods according to the invention may be stored on a computer readable medium. The computer program products according to the invention may be stored at least in part in different media that are computer readable. Archive copies may be stored on standard magnetic discs, hard drives, CD or DVD discs, or magnetic tape. The databases are stored preferably on data servers, but the computer program products may, for example be stored in any of a random access memory of a computer or a processor, a hard drive, an optical or a magneto-optical drive, or in a flash memory, or a ROM, PROM, or E-PROM device. The computer program product may also be arranged in part as a distributed application capable of running on several different computers or computer systems at more or less the same time.

It is also noted that, while the above describes exemplifying embodiments of the inventions, there are several variations and modifications which may be made to the disclosed solution without departing from the scope of the present invention as defined in the appended claims.

The invention claimed is:

1. A method for communication among a plurality of devices connected to each other through a network comprising a multi-level hierarchy, each device having at least one service which provides a set of functions for controlling and/or monitoring the device, the method comprising:

arranging a first device in the multi-level hierarchy, joining a second device to the multi-level hierarchy, wherein either the first device is the parent of the second device or the second device is the parent of the first device, detecting with the first device a presence of the second device and a service of the second device, retrieving with the first device information about functions of the service of the second device, invoking with the first device a function of the service of the second device, and generating messages with at least one of the first device and the second device and transmitting the messages to another of the first device and the second device, wherein the information about functions and the messages are received only by devices that have a same parent as the first device or the second device and by the parent of the first device and the second device, wherein the first device or the second device are interchangeable at least for the detecting, retrieving, arranging and invoking.

2. The method according claim 1, wherein each device is represented by a service provider addressing the services of the device, and at least two service providers are arranged hierarchically by arranging a second service provider as a parent to a first service provider.

3. The method according to claim 2, further comprising:
joining a new service to the first service provider wherein joining a new service comprises
issuing with the new service a message,
receiving with services addressed by the first and the second service provider the message issued by the new service, and
storing with the services addressed by the first and second service provider information associated with the new service.

4. The method according to claim 3, wherein at least three service providers are arranged hierarchically and the services addressed by third service provider ignore the message.

5. The method according to claim 1, wherein the set of functions comprises a command for subscribing to alarms, which are sent to all subscribers upon change.

6. The method according to claim 1, wherein the set of functions comprises a command for subscribing to events, which are sent to all subscribers upon change.

7. The method according to claim 1, wherein a service of a device comprises a number of predefined functions and the service is configured by selecting one or more of said predefined functions.

8. The method according to claim 7, wherein said predefined functions comprise alarm and event generation, variable subscription, alarm subscription, event subscription, search for and retrieval of other devices and remote method invocation.

9. The method according to claim 1, wherein at least some of the services are specifying which services they are interested in, and when a new service is joined to the network, the services interested in that service are notified about the new service.

10. The method according to claim 9, wherein the service specifies the name of or type of services they are interested in or whether they are interested in being notified of all new services.

11. The method according to claim 1, wherein a service of the first device invokes a function of a service of the second device in a point to point manner by sending a message comprising a serialized stream of characters to the second device.

12. The method according to claim 11, wherein the serialized stream of characters is sent via a channel which is any of a null-modem, a normal modem, GSM, a third generation mobile communication, or a radio transmission complying with Bluetooth standards.

13. The method according to claim 1, wherein the method carries out communication between the devices in an industrial, non-industrial or home automation control system.

14. The method according to claim 1, wherein the method carries out communication between devices in an industrial, non-industrial or home automation control system by means of a wireless protocol.

15. A computer program product, comprising:
a non-transitory computer readable medium; and
computer program code means or software code portions recorded on the computer readable medium and executable by a computer or a processor to carry out a method comprising arranging a first device in the multi-level hierarchy, joining a second device to the multi-level hierarchy, wherein either the first device is the parent of the second device or the second device is the parent of the first device, detecting with the first device a presence of the second device and a service of the second device, retrieving with the first device information about functions of the service of the second device, invoking with the first device a function of the service of the second device, and generating messages with at least one of the first device and the second device and transmitting the messages to another of the first device and the second device, wherein the information about functions and the messages are received only by devices that have a same parent as the first device or the second device and by the parent of the first device and the second device, wherein the first device or the second device are interchangeable at least for the detecting, retrieving, arranging and invoking.

* * * * *